United States Patent Office 2,937,636
Patented May 24, 1960

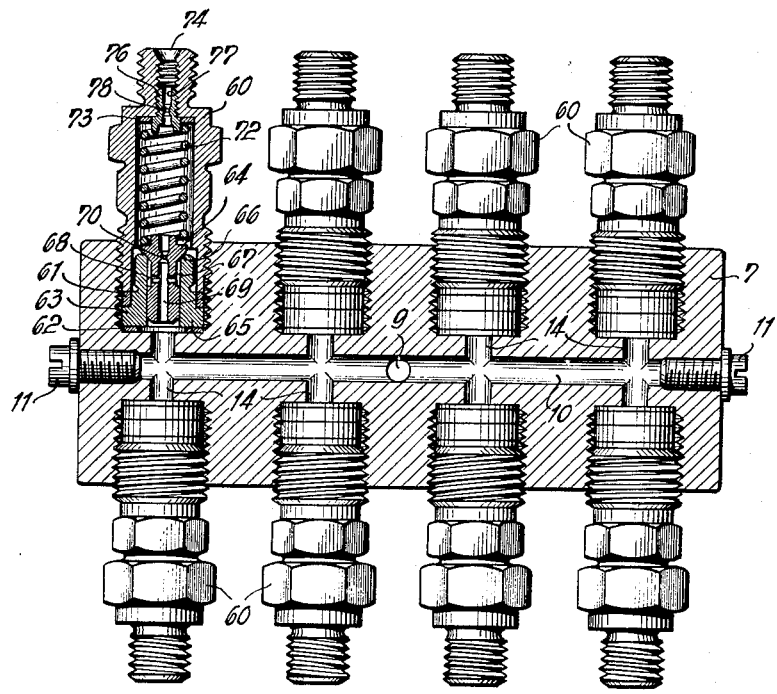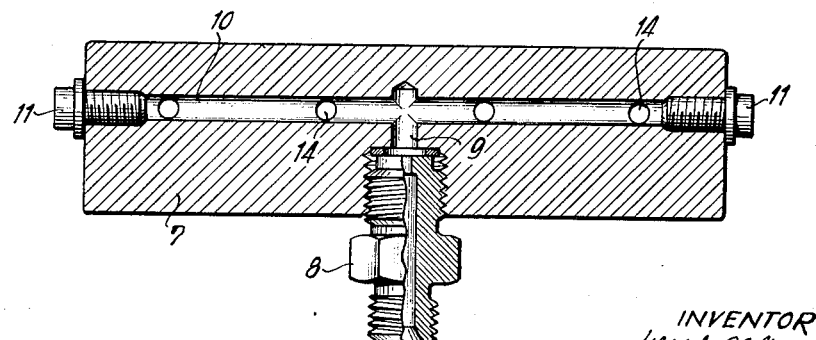

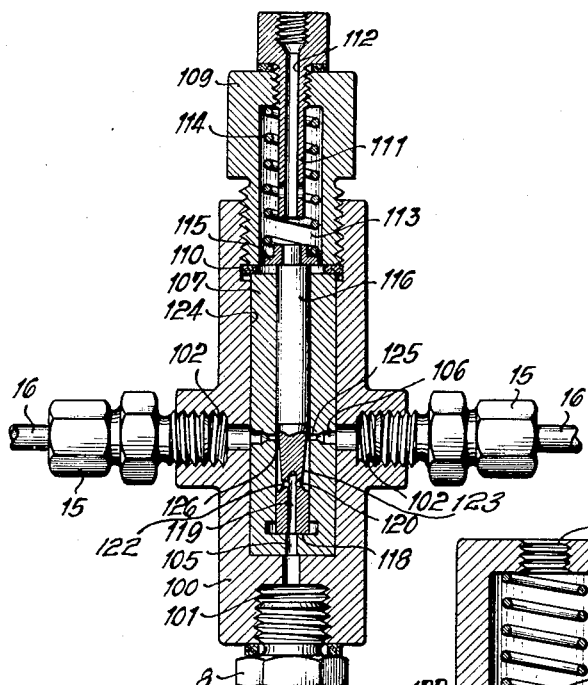
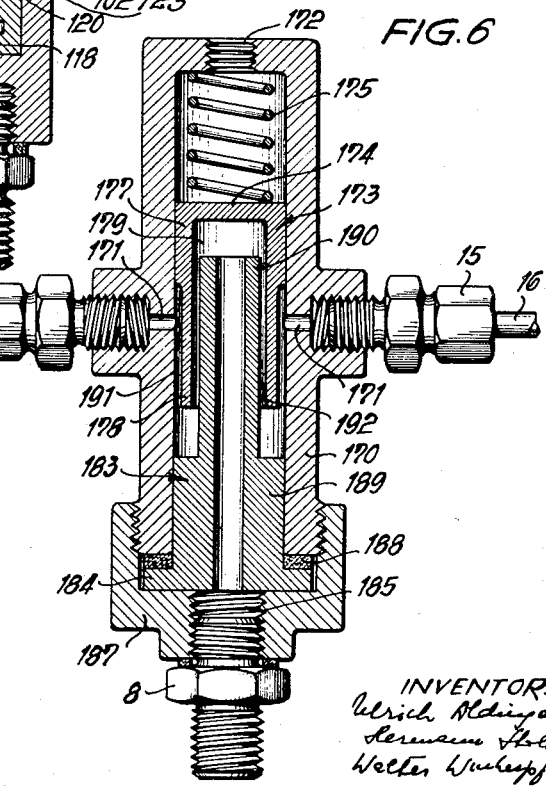

2,937,636

FUEL SUPPLY SYSTEM FOR MULTI-CYLINDER INTERNAL COMBUSTION ENGINES

Ulrich Aldinger, Stuttgart, Hermann Stoll, Bietigheim, Wurttemberg, and Walter Wucherpfennig, Stuttgart, Germany, assignors to Robert Bosch G.m.b.H., Stuttgart, Germany Filed Mar. 31, 1958, Ser. No. 725,368

Claims priority, application Germany Mar. 30, 1957

9 Claims. (Cl. 123—139)

The present invention relates to multicylinder internal combustion engines.

More particularly, the present invention relates to fuel supply systems for multicylinder internal combustion engines.

With fuel supply systems of this type, the fuel may be delivered from a single injection pump to a distributor which distributes fuel to all of the cylinders of the engine. A plurality of branch conduits branch from the distributor and go to the several cylinders. Each of these branch conduits terminates in an injection valve located at the intake manifold of the engine very close to the inlet valve of the cylinder to which the particular conduit delivers the fuel, so that when this intake valve opens the fuel delivered just ahead of this intake valve will enter into the cylinder. A certain pressure is required to automatically open these injection valves which are located at the intake manifold adjacent to the inlet valves of several cylinders, respectively.

It is important to distribute the fuel from the single pump equally to all of the cylinders. Thus, a throttling cooperates with each of the branch conduits to produce a pressure drop in the fuel flowing through the branch conduits, and in order to guarantee equal distribution of the fuel even with extremely small amounts of fuel the pressure drop provided by the throttling devices is equal to 1.3 times the pressure required to open the injection valves. In other words, in each branch conduit the throttling device provides a pressure drop at least equal to 1.3 times the pressure required to open the injection valve with which the branch conduit is connected, and with this arrangement a uniform equal distribution of the fuel to all of the cylinders is guaranteed even with extremely small amounts of fuel.

However, when it is remembered that at a throttling passage of constant cross-section the pressure increases according to the square of the amount of fuel which flows through the passage in a given unit of time, then it is clear that there may be undesirably large pressures with such a fuel supply system when amounts of fuel substantially greater than the minimum amounts of fuel flow through the throttling devices.

One of the objects of the present invention is to provide a fuel supply system in which the pressure cannot build up to undesirably large values at the throttling devices of the branch conduits which lead to the several cylinders.

Another object of the present invention is to provide in a fuel supply system of the above type throttling devices which are capable of automatically operating to prevent undesirably large increases in pressure at the several throttling devices.

A further object of the present invention is to provide a fuel supply system of the above type which will not only prevent an undesirable increase in pressure but which also will still maintain an equal distribution of the fuel to the several cylinders.

It is also an object of the present invention to provide structure capable of accomplishing all of the above objects and at the same time composed of simple and ruggedly constructed elements which operate reliably and which can be made in the form of small compact assemblies.

With the above objects in view, the present invention includes in a fuel supply system for a multicylinder internal combustion engine an injection pump means for pumping fuel and a discharge conduit means leading from this pump means to carry fuel away from the latter. A plurality of branch conduit means respectively lead toward the cylinders of the engine, and a distributor means is located between and communicates with the discharge conduit means and the branch conduit means for distributing the fuel from the discharge conduit means to the several branch conduit means. In accordance with the present invention an adjustable throttling means, which is capable of automatically adjusting itself, cooperates with the distributing means for throttling the flow of fuel to the branch conduits, so as to provide a pressure drop in the fuel flowing to the several branch conduits, and this self-adjusting throttling means also acts to automatically regulate the pressure drop during the operation of the engine.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 3 is a sectional view on an enlarged scale of the distributor means of Fig. 1 taken along line 3—3 of Fig. 1;

Fig. 4 is an enlarged sectional view of the distributor means of Fig. 1 taken along line 4—4 of Fig. 1;

Fig. 5 is a sectional elevational view of another embodiment of the distributor means according to the present invention;

Fig. 6 is a sectional elevational view of a further embodiment of a distributor means according to the present invention;

Figure 1:
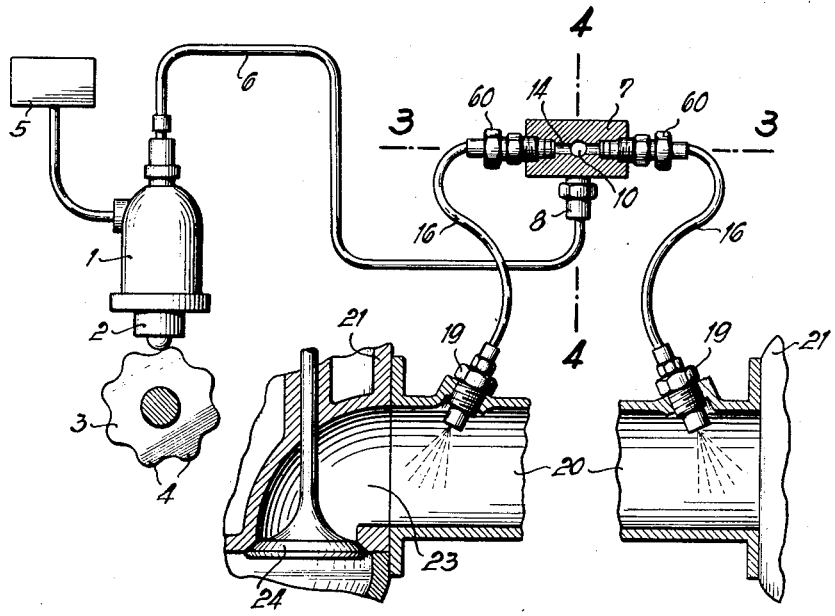
Fig. 1 is a schematic, partly sectional, fragmentary illustration of a fuel supply system according to the present invention.

Referring to Fig. 1, the unillustrated piston of the injection pump 1 is reciprocated by a plunger 2 which cooperates with a cam disc 3 having eight camming portions 4. This cam disc 3 is driven from the crank shaft of the engine at one-half the speed of the crank shaft. The fuel is sucked by the pump 1 from a tank 5 and the injection means 1—4 delivers the fuel under pressure to a discharge conduit means 6 which leads away from the injection pump means and delivers the fuel to a distributor means 7 which serves to distribute the fuel to several branch conduit means 16 which lead respectively to the several cylinders of the engine in a manner described below.

The conduit 6 is connected with the distributor means 7 by a nipple 8, and as may be seen from Fig. 4 the fuel flows from the conduit 6 into an axial conduit 10 of the distributor means, this conduit 10 communicating with the nipple 8 through the bore 9 shown in Fig. 4. The ends of the bore 10 are closed by plugs 11. The distributor means 7 includes in addition to the bores 9 and 10 a plurality of bores 14 branching from the bore 10 in the manner shown most clearly in Fig. 3 and communicating with a plurality of nipples 60 which respectively serve to connect the several branch conduits 16 with the distributor means 7.

Between each nipple 60 and the base of the bore of the distributor means in which the nipple 60 is located there is a valve body 63 mounted in the distributor means. Thus, as may be seen from the upper left portion of Fig. 3, the outer valve body 63 is gripped between the sealing rings 61 and 62, the nipples 60 being threaded into the body of the distributor means 7 for fixing the outer valve body 63 in position between the sealing rings 61 and 62. This outer valve body 63 serves to support and guide for axial movement a movable valve member 64 which has an elongated portion 65 slidably engaging the inner surface of the valve body 63 and which has an outwardly directed annular flange 66 which engages one end of the body 63 to locate the valve in its closed position, this end of the valve body 63 serving as a valve seat for the valve member 64. Between the valve flange 66 and the part 65 which slidably engages the body 63 the movable valve member 64 is formed in its outer surface with an annular groove 67 which extends axially from the flange 66 to the larger portion 65 of the valve member 64, and in addition the valve member 64 is formed with transverse bores 68 providing communication between the groove 67 and an axial bore 69 which extends completely through the valve member 64 and which is provided with a restricted portion 70 having a predetermined cross-sectional area through which the fuel flows when the valve 64 is in the closed position shown in Fig. 3. Thus, this restricted portion 70 of the valve member 64 forms a throttling means which throttles the flow of the fuel through the bore 69 and produces a predetermined pressure drop as the fuel flows through the throttling passage formed by the restricted portion 70. All of the bores of the distributor means 7 which receive the nipples 60 are provided with the structure shown in Fig. 3 for the upper left bore in Fig. 3, so that the above described structure is included in each of the paths leading to each cylinder.

In each of the nipples 60 there is located a coil spring 72 one end of which bears against the valve member 64 and the other end of which bears against a ring 73 which is urged by the spring 72 against a shoulder of the nipple 60, shown in Fig. 3. The thickness of the ring 73 determines the compression of the spring 72 and therefore the force with which the spring 72 urges the valve 64 to its closed position. In other words, it is the thickness of the ring 73 which determines the force required to move the valve member 64 from its closed to its open position.

The outwardly threaded portion 74 of the nipple 60 carries in its interior a throttling member 76 provided with an axial bore 77 having a restricted portion 78 which defines the throttling passage through the throttling member 76 which is threadly fixed to the member 60 in the manner shown in Fig. 3. The cross-sectional area of the throttling passage formed by the restricted portion 78 is larger than the cross-sectional area formed by the restricted portion 70 in the bore 69 of the valve member 64.

The several branch conduits 16 are connected with and lead away from the nipples 60. The ends of the conduits 16 distant from the distributor means 7 are respectively connected with injection valves 19 which are mounted on the intake manifold 20 of the engine. Referring to Fig. 1, only part of one of the cylinders is shown in Fig. 1, and this is the part which includes the intake valve 24 and the passage 23 which is controlled by the valve 24. The passage 23 of each cylinder of the engine 21 communicates with the intake manifold 20, and the injection valves 19 are mounted on the intake manifold next to the passages 23 of the several cylinders.

Thus, as may be seen from Fig. 1 the injection valve 19 is carried by the intake manifold 20 and extends through the wall thereof into the interior thereof for directing the fuel directly into the passage 23 so that when the valve 24 is open the fuel may pass directly into the cylinder to be artificially ignited therein as by a spark plug, for example.

Figure 2:
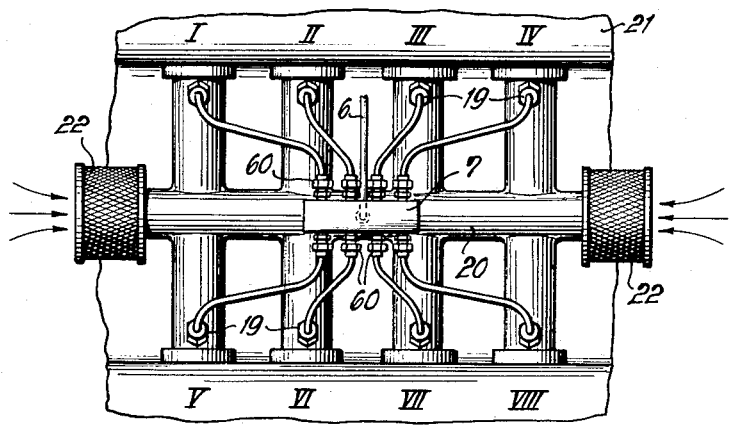
Fig. 2 is a fragmentary, schematic elevational view showing the intake manifold arrangement and the manner in which the fuel supply system cooperates therewith.

As may be seen from Fig. 2, the intake manifold 20 sucks air through its opposite ends which respectively carry the air filters 22, and the air sucked into the intake manifold is delivered by branches thereof to the several cylinders which are indicated in Fig. 2. The valve 19 is just ahead of the intake valve 24 of the several cylinders.

At each revolution of the cam 3 which rotates at one-half the speed of rotation of the crank shaft of the engine, the injection pump 1 is actuated eight times at equal intervals, assuming that the fuel supply adjusting member of the pump is not regulated, to deliver equal amounts of fuel through the discharge conduit 6 and the distributor means 7 to the branch conduits 16 and the injection valves 19.

In each of the branch conduits, the throttling means 70, 78 cooperate together to produce a total pressure drop which is equal at least to 1.3 times the pressure required to open the valve 19 which cooperates with the particular branch conduit 16. In this way equal distribution of the fuel to the several cylinders is guaranteed.

Where the engine operates with small amounts of fuel, the fuel flows through both of the throttling passages formed by the restricted portions 70 and 78, and the major part of the pressure drop resulting from the throttling action is provided by the first restricted portion 70 in each valve member 64. When larger amounts of fuel are consumed by the engine, the pressure drop provided by the restricted throttling portions 70 is so great that the force on the upstream end of each valve member 64 becomes great enough to move the valve member against the force of the spring 72 to an open position. With the valve members 64 in their open positions the greatest part of the fuel bypasses the throttling portion 70, the fuel flowing at this time through the bore 69, the bores 68, the groove 70, and into the nipple 60. However, the fuel is then compelled to flow through the throttling portion 78 of the throttling member 76. Therefore, even in this case the total pressure drop provided by the structure of the invention is great enough to guarantee an accurate distribution of the fuel equally to all of the cylinders. However, at this time, which is to say when the engine operates with large amounts of fuel, the major portion of the throttling action takes place at the second throttling means 78.

The throttling means 70, 78 of the several branch conduits guarantee that the fuel discharged at each stroke of the injection pump is divided into eigth equal portions, which is to say each injection valve 19 receives ⅛ of the amount of fuel discharged at each discharge stroke of the pump 1. These valves 19 open to inject the fuel directly ahead of the valves 24. All of the valves 19 are identical so that the pressure required to open all of the valves is equal, and thus the restricted portions 70 and 78 of each fuel path are identical. Furthermore, it has proved to be of advantage to make the discharge conduit means 6 approximately twice as long as each conduit 16.

The other embodiments of the invention which are described below differ from the above-described embodiment of the invention through a different type of throttling structure and another type of distributor. In the embodiments described below the distributor distributes the fuel from a central passage radially along a plurality of branch conduits leading to the several cylinders, as distinguished from the above-described arrangement where two rows of branch conduits are provided leading to the several cylinders.

According to the embodiment of the invention which is illustrated in Fig. 5, the distributor means 100 is in the form of an elongated body having an axial bore passing therethrough and having a lower inlet opening 101 which is threadedly connected with the nipple 8 so as to receive the fuel from the injection pump. This body 100 is formed with eight discharge bores 102 located in a common plane which is normal to the axis of the body 100 and radiating from the axial bore of the member 100, these bores 102 being uniformly distributed about the axis of the member 100 and being threadedly connected with the nipples 15 which respectively are connected to the branch conduits 16 leading to the several cylinders in the manner described above. The inner bore portion 124 of the member 100 receives an elongated cylindrical sleeve 107 which is formed at its bottom end with an axial bore 105 aligned with the stepped axial bore 101 of the member 100, and this sleeve 107 is formed with eight radial bores 106 located in the same plane as the bores 102 and respectively communicating therewith, in the manner shown in Fig. 5. A nipple 109 is threaded into the top end of the member 100 and presses with its bottom end against the sealing ring 110 which in turn presses against the top end of the cylindrical sleeve 107 so as to press the latter against a shoulder in the interior of the member 100, as illustrated in Fig. 5.

The nipple 109 threadedly carries a tubular stop member 111 which is formed with an axial bore 112 to lead away from the distributor fuel which reaches the interior space 113 in the nipple 109. Within this space 113 is located a spring 114 which surrounds the tubular member 111 and which engages with its bottom end a ring 115 carried by the top end of a valve member 116 which is axially movable in the interior of the cylindrical sleeve 107. The end of the spring 114 opposite from the ring 115 presses against the top wall of the nipple 109. The end of the member 116 which is opposite from the ring 115 is pressed by the spring 114 against the bottom wall of the sleeve 107 which is formed with the axial bore 105. The surface of the sleeve 107 which is engaged by the member 116 is indicated at 118, and this surface 118 acts only as a stop to limit the downward movement of the member 116.

This member 116 is formed along a portion of its length only with an axial bore 119 which communicates with the bore 105 and which communicates also with a pair of radial bores 120 leading from the bore 119 to the exterior of the member 116. At the region of the bores 120, this member 116 has a portion 123 of frusto conical configuration so as to define with the inner surface of the sleeve 107 a chamber 122 which communicates with the radial bores 120. It will be noted that this construction gives to the chamber 122 a cross-section which becomes gradually smaller from the bottom to the top end of the chamber 122. In the position of the parts shown in Fig. 5, which is the bottom end position of the member 116, only the top end of the chamber 122 communicates with the bores 106, so that only a portion of the chamber 122 which is of an extremely small cross-sectional area is in communication with the bores 106 at this time. The ends of the bores 106 which are nearest to the chamber 122 are of reduced cross-section, as indicated at 125, so that these small portions 125 of the bores 106 cooperate with the small cross-sectional area of the chamber 122 in the position of the part shown in Fig. 5 to provide a throttling means 126 of predetermined small cross-section with the parts in the position shown in Fig. 5. Thus, with the parts in the position shown in Fig. 5 the several throttling means 126 have their smallest cross-sectional areas through which fuel flows.

With this embodiment of the invention, the fuel in the chamber 122 builds up a pressure which urges the member 116 upwardly against the force of the spring 114 with an increasing force as the amount of fuel which flows per unit of time increases. Therefore, as this amount of fuel increases the pressure of the fuel will raise the member 116 against the force of the spring 114 to a position which automatically corresponds with the amount of fuel flowing per unit of time to give the desired drop in pressure to the throttling means 126. The maximum movement of the member 116 is determined by the bottom end of the stop member 111, and when the top end of the member 116 engages the bottom end of the member 111, in the position of the part shown in Fig. 5, the largest cross-sectional area of the chamber 122 is located at the elevation of the inlet ends 125 of the bores 106, respectively, so that the throttling means at this time has the largest cross-sectional area through which the fuel flows. Thus, it will be noted that with the embodiment of Fig. 5 there are not a pair of throttling means through which the fuel flows, as was the case with the embodiments of Figs. 1 to 4, and instead the single throttling means adjusts itself automatically to provide the desired regulation which prevents the pressure of the fuel from building up to an undesirably large value.

In the embodiment of the invention which is illustrated in Fig. 6, the throttling means 170 includes a tubular body formed substantially midway between its ends with a plurality of bores 171 extending radially from its axial bore and these bores 171 are respectively connected threadly with the nipples 15 which are in turn connected with the conduits 16 leading to the several cylinders in the manner described above. The top wall of the distributor 170 is formed with a discharge opening 172 through which oil which leaks may be discharged. A sleeve 173 is slidable within the distributor member 170 and this sleeve 173 has a top wall 174 against which the bottom end of a coil spring 175 presses, the top end of the spring 175 also pressing against the top wall of the distributor member 170 so as to urge the sleeve 173 downwardly, as viewed in Fig. 6. The sleeve 173 engages the inner surface of the outer member 170 with its upper portion 177. This sleeve 177 has an elongated lower portion 178 of reduced outer diameter which forms with the inner surface of member 170 an elongated annular gap 191.

Within the interior of the member 170 is also located a tubular member 183 having a portion 189 in sliding engagement with the interior surface of the member 170. At its bottom end, as viewed in Fig. 6, the member 183 has a flange 184 which engages a sealing ring 188 and which is pressed against this sealing ring by a cap nut 187 which is threadly connected with the member 170. This cap nut 187 is formed with a threaded axial bore 185 through which the fuel enters into the distributor means 170. The nipple 8 is threadly connected with the bore 185 of the cap nut 187, and the fuel is delivered from the injection pump to the bore 185, this bore 185 communicating with the tubular interior of member 183. This member 183 is provided with an upper elongated portion 190 of a smaller exterior diameter than the portion 189 of the member 183, and this portion 190 extends into the member 173 to define with the interior surface thereof an elongated annular gap 192.

The throttling means of Fig. 6 which provide the desired pressure drop is formed by the small cross-sectional areas of the gaps 191 and 192 as well as the length of these gaps. Thus, the fuel entering into the opening 185 travels through the tubular member 183 to the chamber 179 in the interior of the member 177, and from this chamber the fuel flows in one direction along the gap 192 and then in an opposite direction along the gap 191 to the radial bores 171 from where the fuel flows into the several cylinders. As the amount of fuel which flows per unit of time increases the pressure in the chamber 179 will increase so as to compress the spring 175 to an increasing extent, the member 173 at this time moving toward the top end of the member 170 as viewed in Fig. 6, and thus the length of the throttling gaps 191 and 192 is gradually reduced in this way until an equilibrium condition is obtained during the time that the amount of fuel supplied per unit of time remains unchanged. Thus, with the embodiment of Fig. 6 a self-adjusting throttling means is provided to prevent an undesirably large build-up in the pressure of the fuel while at the same time providing the desired pressure drop which guarantees uniform distribution of the fuel to all of the cylinders.

Figure 7:
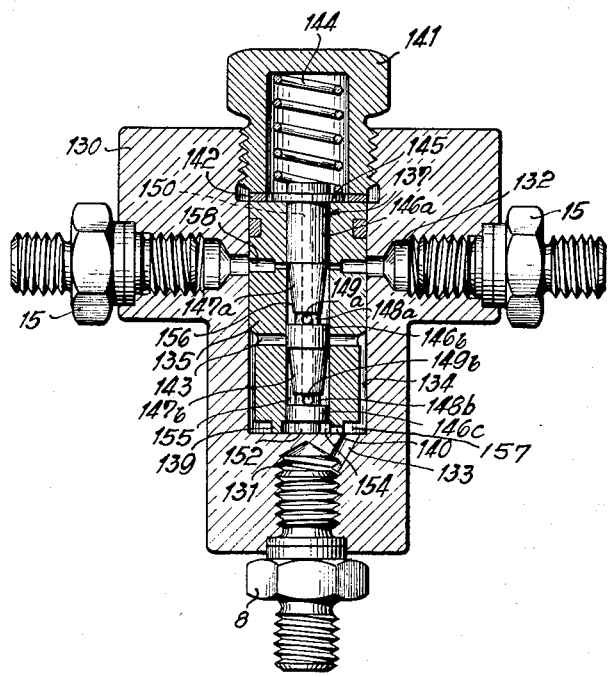
Fig. 7 is a sectional elevational view of still another embodiment of a distributor means according to the present invention.

According to the embodiment of the invention which is illustrated in Fig. 7, the distributing means of this embodiment has no opening through which oil which leaks can escape. The distributor means 130 of Fig. 7 is in the form of an elongated axially bored body having an inlet opening 131 which is threaded and which is threadly connected with the nipple 8 which directs the fuel from the injection pump into the inlet opening 131. This member 130 is formed with radial openings 132 located in a single plane which is normal to the axis of the member 130 and these openings 132 are uniformly distributed about the axis of the member 130 and are threadly connected with the nipples 15 leading to the several cylinders of the engine. At one side of the inlet opening 131 the member 130 is formed with a bore 133 which is inclined upwardly away from the inlet opening 131 and which communicates with the bottom end of the central bore 134 of the member 130, this bore 134 being cylindrical and receiving in its interior a cylindrical sleeve 135 in which a valve member 137 is axially slidable. The portion of the sleeve 135 which is adjacent to the inlet opening 131 has a smaller diameter than the upper portion of the member 135 which is in slidable engagement with the inner surface of the member 130. The cylindrical sleeve 135 is provided at its bottom end, as viewed in Fig. 7, with an annular projection 139 formed with a radial groove 140, as shown in Fig. 7.

The distributor member 130 threadly carries at its top end a closure member 141 which is axially bored on part of its length so as to receive in its interior a spring 144. This member 141 presses against a sealing ring 142 which in turn presses against the sleeve 135 so as to press the latter against the bottom end of the bore 134. The lower portion of the sleeve 135 which is of a smaller outer diameter than the remainder of the sleeve 135 is formed with a plurality of radial bores 143 which lead from the interior of the sleeve 135 to the exterior thereof just beneath the larger portion of the sleeve 135. The spring 144 bears at its top end against the top wall of the closure member 141 and its bottom end against a ring 145 carried by or fixed to or integral with member 137 so as to press the bottom end of the latter against the bottom end of the bore 134 in the position of the parts shown in Fig. 7. This member 137 is provided with three axially spaced cylindrical portions 146a, 146b, and 146c which slidably engage the inner surface of the sleeve 135. Between these cylindrical exterior surface portions of the member 137 are located frustoconical portions 147a and 147b, as indicated in Fig. 7. At the bottom end of the frustoconical portion 147a the member 137 is provided with another cylindrical portion 148a of the relatively small diameter which connects the frustoconical portion 147a with the cylindrical portion 146b, and the bottom, smaller end of the frustoconical portion 147b is connected with another small cylindrical portion 148b of the member 137 which is located between the frustoconical portion 147b and the cylinder portion 146c of the member 137. The member 137 is formed with an axial bore 150 extending downwardly from its top end to the elevation of the cylindrical portion 146c of the member 137, and at the cylindrical portions 148a and 148b, the member 137 is formed with radial bores 149a and 149b respectively, which communicate with the axial bore 150. The lowermost part 152 of the member 137 is also of a reduced diameter so as to define with the bottom ring 139 of the sleeve 135 an annular chamber 154 which communicates with the groove 140. The frustoconical portion 147b of member 137 defines with the interior of the sleeve 135 a chamber 155, and the frustoconical portion 147a of member 137 defines with the interior surface of the sleeve 135 a chamber 156. The lower portion of the sleeve 135 which is of a smaller outer diameter than the upper portion thereof defines with the inner surface 134 of the member 130 a chamber 157.

The sleeve 135 is formed at the elevation of the radial bores 132 with radial bores 158 respectively communicating with the bores 132 and respectively leading from the axial bore of the sleeve 135 to the radial bores 132 of the member 130. These radial bores 158 of the sleeve 135 have inner ends of reduced diameter, as indicated in Fig. 7 and these inner ends of the bores 158 are located at the elevation of the top end of the chamber 156 in the position of the parts shown in Fig. 7, this top end of the chamber being of a smaller cross-section than the remainder of the chamber 156. Thus, in the position of the parts shown in Fig. 7 the extremely small cross-sectional area of the top end of the chamber 156 provides only a slight opening of the bores 158. In the position of the parts shown in Fig. 7 the cylindrical portion 146b of the member 137 completely closes the radial bores 143.

At each discharge stroke of the injection pump fuel is delivered to the inlet 131 of the distributor 130, and this fuel flows through the passage 133 on one hand into the chamber 157 and on the other hand through the groove 140, which acts as a stabilizing throttle, into the chamber 154. Thus, with the parts in the rest position shown in Fig. 7 the pressure of the fuel will act on the bottom end of the member 137 so as to raise the latter from its illustrated rest position, and after only a short axial movement the member 137 opens the bores 143 so that the fuel now flows into the chamber 155. From the chamber 155 fuel flows through the bores 149b into the axial bore 150 of the member 137, and from this axial bore the fuel flows on the one hand through the bores 149a into the chamber 156 and on the other hand through the bore 150 into the interior of the closure member 141. The pressure of the fuel in the closure member 141, which acts on the top end of the member 137, is smaller than the pressure of the fuel which acts on the bottom end of the member 137, and the pressure of the fuel within the hollow closed member 141 augments the force with which the spring 144 presses downwardly on the member 137. These forces act on the member 137 to move the latter until equilibrium is reached and the member 137 remains stationary.

The groove 140 is of such size that it provides a resistance to the flow of fuel into the chamber 154 at each pressure stroke of the injection pump as well as a resistance to the flow of fuel out of the chamber 154 between the pressure strokes of the injection pump, and these resistances to the fuel flow in both directions which are provided by the groove 140 are of such a magnitude that the member 137 is maintained in a middle position.

The frustoconical surface 147a forms together with the smaller ends of the bores 158 a throttling means which produces the desired pressure drop in the fuel. The cross-sectional area of the passage of this throttling means provided by surface 147a together with the openings 158 remains at all times at approximately the same ratio to the cross-sectional area of the throttling means provided by the cooperation of the bores 143 with the frustoconical surface 147b. Inasmuch as the pressure of the fuel at the frustoconical surface 147b is determined by the spring 144, the changes in the pressure of the fuel at the inlet ends of the bores 158 take place even during changes in the amount of fuel which flows per unit of time according to changes in the force of the spring 144, so that there is very little build-up in the pressure of the fuel while at the same time the desired pressure drop is maintained so as to guarantee equal distribution of the fuel to all of the cylinders.

It will be understood that each of the elements described above, or two or more together, may also find a useful application in other types of fuel supply systems differing from the types described above.

While the invention has been illustrated and described as embodied in fuel supply systems for multicylinder internal combustion engines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a fuel supply system for a multicylinder internal combustion engine, in combination, injection pump means for pumping fuel; discharge conduit means leading from said pump means to carry fuel away from the latter; a plurality of branch conduit means respectively leading toward the cylinders of the engine; distributor means located between and communicating with said discharge conduit means and said plurality of branch conduit means for distributing fuel from said discharge conduit means to said plurality of branch conduit means, said distributor means including a pair of throttling members located along the path of fuel flow from said discharge conduit means to at least one of said branch conduit means for providing a pressure drop as the fuel flows through said throttling members, each of said throttling members having a predetermined throttling passage through which the fuel flows; and means cooperating with one of said throttling members for automatically moving the latter to an inoperative position where the fuel by-passes said one throttling member when the amount of fuel which flows per unit of time from said discharge conduit means toward said plurality of branch conduit means increases above a predetermined value.

2. In a fuel supply system for a multicylinder internal combustion engine, in combination, injection pump means for pumping fuel; discharge conduit means leading from said pump means to carry fuel away from the latter; a plurality of branch conduit means respectively leading toward the cylinders of the engine; distributor means located between and communicating with said discharge conduit means and said plurality of branch conduit means for distributing fuel from said discharge conduit means to said plurality of branch conduit means, said distributor means including a pair of throttling members located one after the other along the path of fuel flow from said discharge conduit means to said plurality of branch conduit means for throttling the flow of fuel and for producing a pressure drop, each of said throttling members having a throttling passage of predetermined cross-section and one of said passages being smaller than the other; and means cooperating with that throttling member which has the smaller of said throttling passages for moving automatically the latter throttling member to an inoperative position where the fuel by-passes the throttling member when the amount of fuel which flows per unit of time from said discharge conduit means towards said plurality of branch conduit means increases above a predetermined value.

3. In a fuel supply system for a multicylinder internal combustion engine, in combination, injection pump means for pumping fuel; discharge conduit means leading from said pump means to carry fuel away from the latter; a plurality of branch conduit means respectively leading toward the cylinders of the engine; distributor means located between and communicating with said discharge conduit means and said plurality of branch conduit means for distributing fuel from said discharge conduit means to said plurality of branch conduit means; throttling passage means forming part of said distributor means and located in the path of fuel flow from said discharge conduit means to said branch conduit means for throttling the flow of fuel and for producing a pressure drop in the fuel; and automatic regulating means cooperating with said throttling passage means for automatically regulating the length of said throttling passage means in accordance with changes in the amount of fuel flowing per unit of time.

4. In a fuel supply system for a multicylinder internal combustion engine, in combination, injection pump means for pumping fuel; discharge conduit means leading from said pump means to carry fuel away from the latter; a plurality of branch conduit means respectively leading toward the cylinders of the engine; distributor means located between and communicating with said discharge conduit means and said plurality of branch conduit means for distributing fuel from said discharge conduit means to said plurality of branch conduit means, said distributor means including a pair of coaxial cylinders located one within the other and defining between themselves a throttling gap through which the fuel flows from said discharge conduit means toward said plurality of branch conduit means; and means cooperating with one of said cylinders for moving the same axially with respect to the other of said cylinders for varying length of said throttling gap so as to regulate the pressure drop provided by the throttling gap.

5. In a fuel supply system for a multicylinder internal combustion engine, in combination, injection pump means for pumping fuel; discharge conduit means leading from said pump means to carry fuel away from the latter; a plurality of branch conduit means respectively leading toward the cylinders of the engine; distributor means located between and communicating with said discharge conduit means and said plurality of branch conduit means for distributing fuel from said discharge conduit means to said plurality of branch conduit means, said distributor means including a pair of throttling members located one after the other along the path of fuel flow from said discharge conduit means to each of said plurality of branch conduit means, said distributor means including a by-pass by-passing one of said pair of throttling members and a valve means for closing said by-pass to compel the fuel to flow through said one throttling member, said valve means automatically opening when the amount of fuel which flows per unit of time exceeds a predetermined value for opening said by-pass so that the fuel then by-passes said one throttling member.

6. In a fuel supply system for a multicylinder internal combustion engine, in combination, a tubular valve guiding member forming part of passage through which fuel flows from a fuel pump toward a cylinder of the engine; an elongated valve member axially movable in said tubular member and having a valve portion engaging an end of said tubular member for closing a passage between said tubular member and said valve member, the latter being formed with an axial bore passing therethrough and having a restricted throttling portion throttling fuel flow through the bore of said valve member; spring means cooperating with said valve member for urging the same to a closed position engaging said end of said tubular member, so that said valve member is moved to an open position where the fuel flows along the passage between said valve member and tubular member to bypass said bore of said valve member when the pressure of the fuel is great enough to overcome the force of said spring means; and a second throttling member located downstream of said valve member in the path of fuel flow and through which the fuel flows after passing either through the bore of said valve member or through the passage between said valve member and said tubular member.

7. In a fuel supply system for a multicylinder internal combustion engine, in combination, a fuel distributing cylinder formed with an axial bore and a plurality of radial bores located in a common plane normal to the axis of said cylinder and radiating from said axial bore thereof, said radial bores respectively leading towards the cylinders of the engine; and an elongated flow control member axially slidable in said axial bore of said cylinder and having an exterior frusto-conical surface portion located at the region of said radial bores for controlling the cross-section of the passage in said cylinder leading to said radial bores according to the axial position of said frusto-conical surface portion of said flow control member with respect to said radial bores, said cylinder being formed with a second set of radial bores radiating from said axial bore thereof and located upstream of the first-mentioned radial bores in the path of fuel flow toward said first mentioned radial bores, and said flow control member having a second frusto-conical surface portion cooperating with said second set of radial bores for throttling the flow of fuel from said second set of radial bores into said cylinder according to the axial position of said flow control member in said cylinder.

8. In a fuel supply system for a multicylinder internal combustion engine, in combination, a fuel distributing cylinder formed with an axial bore and a plurality of radial bores located in a common plane normal to the axis of said cylinder and radiating from said axial bore thereof, said radial bores respectively leading towards the cylinders of the engine; and an elongated flow control member axially slidable in said axial bore of said cylinder and having an exterior frusto-conical surface portion located at the region of said radial bores for controlling the cross-section of the passage in said cylinder leading to said radial bores according to the axial position of said frusto-conical surface portion of said flow control member with respect to said radial bores, said cylinder being formed with said set of radial bores radiating from said axial bore thereof and located upstream of the first-mentioned radial bores in the path of fuel flow toward said first mentioned radial bores, and said flow control member having a second frusto-conical surface portion cooperating with said second set of radial bores into said cylinder according to the axial position of said flow control member in said cylinder, said flow control member having a pair of opposed ends one of which is located upstream of the second set of radial bores along the path of fuel flow; means cooperating with said one end of said flow control member for maintaining the latter at the pressure of the fuel which is upstream of said second set of radial bores; and means cooperating with the opposite end of said flow control member for maintaining the latter at the pressure of the fuel downstream of said second set of radial bores.

9. In a fuel supply system for a multicylinder internal combustion engine, in combination, a fuel distributing cylinder formed with an axial bore and a plurality of radial bores located in a common plane normal to the axis of said cylinder and radiating from said axial bore thereof, said radial bores respectively leading towards the cylinders of the engine; an elongated flow control member axially slidable in said axial bore of said cylinder and having an exterior frusto-conical surface portion located at the region of said radial bores for controlling the cross-section of the passage in said cylinder leading to said radial bores according to the axial position of said frusto-conical surface portion of said flow control member with respect to said radial bores, said cylinder being formed with a second set of radial bores radiating from said axial bore thereof and located upstream of the first-mentioned radial bores in the path of fuel flow toward said first mentioned radial bores, and said flow control member having a second frusto-conical surface portion cooperating with said second set of radial bores into said cylinder according to the axial position of said flow control member in said cylinder, said flow control member having a pair of opposed ends one of which is located upstream of the second set of radial bores along the path of fuel flow; means cooperating with said one end of said flow control member for maintaining the latter at the pressure of the fuel which is upstream of said second set of radial bores; means cooperating with the opposite end of said flow control member for maintaining the latter at the pressure of the fuel downstream of said second set of radial bores; and spring means acting on said opposite end of said flow control member for augmenting the force of the fuel acting on said opposite end of said flow control member.

References Cited in the file of this patent

UNITED STATES PATENTS

| | | |
|---|---|---|
| 2,341,257 | Wunsch | Feb. 8, 1944 |
| 2,516,147 | Robinson | July 25, 1950 |
| 2,843,097 | Dolza | July 15, 1958 |
| 2,843,098 | Dolza | July 15, 1958 |
| 2,851,025 | Dahl | Sept. 9, 1958 |